US010044583B2

(12) United States Patent
Kim et al.

(10) Patent No.: US 10,044,583 B2
(45) Date of Patent: Aug. 7, 2018

(54) FAST DETECTION AND IDENTIFICATION OF LOST PACKETS

(71) Applicant: Barefoot Networks, Inc., Santa Clara, CA (US)

(72) Inventors: Changhoon Kim, Palo Alto, CA (US); Minlan Yu, Cambridge, MA (US); Yuliang Li, Cambridge, MA (US)

(73) Assignee: BAREFOOT NETWORKS, INC., Santa Clara, CA (US)

( * ) Notice: Subject to any disclaimer, the term of this patent is extended or adjusted under 35 U.S.C. 154(b) by 0 days.

(21) Appl. No.: 14/832,221

(22) Filed: Aug. 21, 2015

(65) Prior Publication Data
US 2017/0054619 A1 Feb. 23, 2017

(51) Int. Cl.
*H04L 12/26* (2006.01)

(52) U.S. Cl.
CPC ........ *H04L 43/0829* (2013.01); *H04L 43/028* (2013.01); *H04L 43/12* (2013.01)

(58) Field of Classification Search
CPC ....... H04L 29/06; H04L 45/00; H04L 45/566; H04L 69/22
USPC ........................................ 370/229
See application file for complete search history.

(56) References Cited

U.S. PATENT DOCUMENTS

| | | | | |
|---|---|---|---|---|
| 5,432,776 A * | 7/1995 | Harper | .................... | H04L 43/00 370/252 |
| 6,112,236 A * | 8/2000 | Dollin | .................... | H04L 43/00 370/253 |
| 6,754,662 B1 * | 6/2004 | Li | .................... | G06F 17/30949 707/693 |
| 6,804,240 B1 * | 10/2004 | Shirakawa | .............. | H04L 29/06 370/392 |
| 7,080,259 B1 * | 7/2006 | Nakanishi | ............ | G06Q 20/363 380/277 |
| 7,359,404 B1 * | 4/2008 | Allan | .................. | H04L 41/0873 370/469 |
| 7,617,231 B2 * | 11/2009 | Moon | ..................... | G06F 21/64 |

(Continued)

OTHER PUBLICATIONS

Eppstein, David, et al., "What's the Difference? Efficient Set Reconciliation without Prior Context," SIGCOMM '11, Aug. 15-19, 2011, pp. 218-229, ACM, available at http://conferences.sigcomm.org/sigcomm/2011/papers/sigcomm/p218.pdf.

*Primary Examiner* — Khaled Kassim
*Assistant Examiner* — Berhanu Belete
(74) *Attorney, Agent, or Firm* — Adeli LLP

(57) ABSTRACT

The invention provides a packet loss detection system that in near-real time detects packet loss and reports the identities of the lost packets. The identities of the lost packets are based on a set of packet-specific information that includes five-tuple flow information of the packet and other unique packet identifiers. A set of meters are placed at various vantage points in the network, each meter generates digests summarizing all the traffic passing through itself. The digests are exported to a collector/analyzer, which decodes the digests and performs an analysis to detect packet losses and to determine the lost packets' identities. The collector compares between the traffic digests generated by all the meters surrounding the segment. Mismatches among the digests indicate packet losses. The collector restores the identifiers of the lost packets by further decoding the mismatches between the digests.

14 Claims, 12 Drawing Sheets

(56) References Cited

U.S. PATENT DOCUMENTS

| | | | | |
|---|---|---|---|---|
| 7,668,949 B1* | 2/2010 | Allan | H04L 41/0873 | 709/220 |
| 7,839,891 B1* | 11/2010 | Allan | H04L 41/0869 | 370/400 |
| 9,092,441 B1* | 7/2015 | Patiejunas | G06F 17/30221 | |
| 9,443,108 B1* | 9/2016 | Roth | G06F 21/70 | |
| 9,838,286 B2* | 12/2017 | Zhang | H04L 43/0829 | |
| 2003/0001964 A1* | 1/2003 | Masukura | H04N 11/042 | 348/441 |
| 2003/0009681 A1* | 1/2003 | Harada | G06F 21/10 | 713/193 |
| 2003/0226034 A1* | 12/2003 | Howard | H04L 63/1408 | 726/22 |
| 2004/0123220 A1* | 6/2004 | Johnson | H04J 3/1617 | 714/774 |
| 2005/0086353 A1* | 4/2005 | Shirakawa | H04L 29/06 | 709/230 |
| 2005/0220023 A1* | 10/2005 | Kodialam | H04L 41/14 | 370/235 |
| 2006/0123226 A1* | 6/2006 | Kumar | H04L 63/0281 | 713/154 |
| 2006/0136728 A1* | 6/2006 | Gentry | H04L 9/3242 | 713/176 |
| 2008/0194198 A1* | 8/2008 | Namihira | H04L 47/10 | 455/7 |
| 2008/0219181 A1* | 9/2008 | Kodialam | H04L 41/14 | 370/252 |
| 2008/0222414 A1* | 9/2008 | Wang | H04L 9/0643 | 713/161 |
| 2009/0089578 A1* | 4/2009 | King | G06F 21/72 | 713/161 |
| 2009/0208000 A1* | 8/2009 | Yoshioka | H04N 7/1675 | 380/42 |
| 2009/0307640 A1* | 12/2009 | Chapman | G06F 17/5045 | 716/136 |
| 2011/0129088 A1* | 6/2011 | Lee | H04L 9/0869 | 380/44 |
| 2013/0019317 A1* | 1/2013 | Whelan | H04B 7/18593 | 726/26 |
| 2013/0232565 A1* | 9/2013 | O'Connor | H04B 7/18584 | 726/13 |
| 2014/0143446 A1* | 5/2014 | Jacobson | G06F 17/30174 | 709/248 |
| 2014/0173137 A1* | 6/2014 | Jacobson | H04L 45/021 | 709/248 |
| 2014/0244598 A1* | 8/2014 | Haustein | G06F 17/30156 | 707/692 |
| 2015/0143122 A1* | 5/2015 | Abraham | H04L 9/3239 | 713/170 |
| 2015/0199416 A1* | 7/2015 | Kashyap | G06F 17/30581 | 707/622 |
| 2016/0085955 A1* | 3/2016 | Lerner | G06F 21/31 | 726/20 |
| 2016/0105277 A1* | 4/2016 | Isshiki | G06F 21/62 | 380/28 |
| 2016/0149784 A1* | 5/2016 | Zhang | H04B 1/0003 | 370/229 |
| 2016/0149788 A1* | 5/2016 | Zhang | H04L 43/10 | 709/224 |

* cited by examiner

FAST DETECTION AND IDENTIFICATION OF LOST PACKETS

BACKGROUND

Packet losses are common in data center networks, and can be caused by many reasons such as misconfigurations, resource shortages, software errors, and hardware failures. These losses become more significant with the rapid expansion of data centers and the growth of switch throughput and chip complexity. While packet losses often have significant impact on application performance and network operations, existing monitoring tools cannot provide enough information about the location of individual lost packets and the flows they belong.

SUMMARY

Some embodiments of the invention provide a packet loss detection system that in near-real time detects packet loss and reports the identities of the lost packets. In some embodiments, the identities of the lost packets are based on a set of packet-specific information that includes five-tuple flow information of the packet and other unique packet identifiers. In some embodiments, a set of meters are placed at various vantage points in the network, each meter generates digests summarizing all the traffic passing through itself. The digests are exported to a collector/analyzer, which decodes the digests and performs an analysis to detect packet losses and to determine the lost packets' identities. In some embodiments, the collector compares between the traffic digests generated by all the meters surrounding the segment. Mismatches among the digests indicate packet losses. In some embodiments, the collector restores the identifiers of each lost packet by further decoding the mismatches between the digests.

In some embodiments, each traffic digest generated by a traffic meter (upstream or downstream) is an accumulation of packet identifying information in a specialized data structure. Specifically, where, for each packet arriving at the traffic meter, the traffic meter extracts packet identifying information from the data packet and incorporates the extracted information into a Bloom-filter based data structure. The data structure has m cells, and the extracted packet identifying information is incorporated into k of cells that are selected by k different hash functions of the extracted packet identifying information.

In some embodiments, each cell incorporates the packet identifying information of an incoming packet by bit-wise exclusive-or (XOR) it with an accumulated value stored by the cell. The cell also maintains a counter that keeps track of how many packets has been hashed into the cell (i.e., how many packets whose identifying information has been incorporated into this cell because the cell is selected by one of the k hash functions.)

In some embodiments, an upstream digest that represents all of the upstream flows into the network segment and a downstream digest that represent all of the downstream flows out of the network segment are compared against each other in order to determine if there is packet loss. Some embodiments decode the difference between the upstream digest and the downstream digest in order to determine the identity of the lost packets.

Some embodiments allow union of the upstream digests as well as union of downstream digests. The union of upstream digests (or upstream digest union) would represent all of the upstream flows into the network segment and the union of downstream digests (or downstream digest union) would represent all of the downstream flows out of the network segment. The upstream digest union and the downstream digest union can then be compared with each other to detect packet loss or identify lost packets.

Some embodiments provide identifiers for segregating the accumulation of packet IDs according to input ports. In some embodiments, each upstream meter tags packets entering its corresponding input port with an ID identifying the input port or the upstream meter. Downstream meters receiving these packets can therefore segregate the accumulation of packet identifiers according to the upstream meter IDs.

Meters in some embodiments collects traffic digests in small batches of packets (e.g., every 10 ms or every 1K packets) and immediately report the digests to the central collector as soon as the batch is over. To compare traffic digests correctly between upstream and downstream meters, some embodiments provide a mechanism for a pair of upstream and downstream meters to agree on the boundary of batches so that they can put the same packet in the same batch. Some embodiments let each packet carry the batch information (i.e., batch IDs) explicitly from upstream meters to downstream meters, thereby ensuring timely and accurate reporting of packet losses even when there is packet loss and/or packet reordering.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a packet loss detection system (referred to as LossRadar) that in near-real time detects packet loss and reports the identities of the lost packets. In some embodiments, the identities of the lost packets are based on a set of packet-specific information that includes five-tuple flow information of the packet and other unique packet identifiers. In some embodiments, a set of meters are placed at various vantage points in the network, each meter generates digests summarizing all the traffic passing through itself. The digests are exported to a collector/analyzer, which decodes the digests and performs an analysis to detect packet losses and to determine the lost packets' identities. In some embodiments, the collector compares between the traffic digests generated by all the meters surrounding the segment. Mismatches among the digests indicate packet losses. In some embodiments, the collector restores the identifiers of each lost packet by further decoding the mismatches between the digests.

Figure 1:
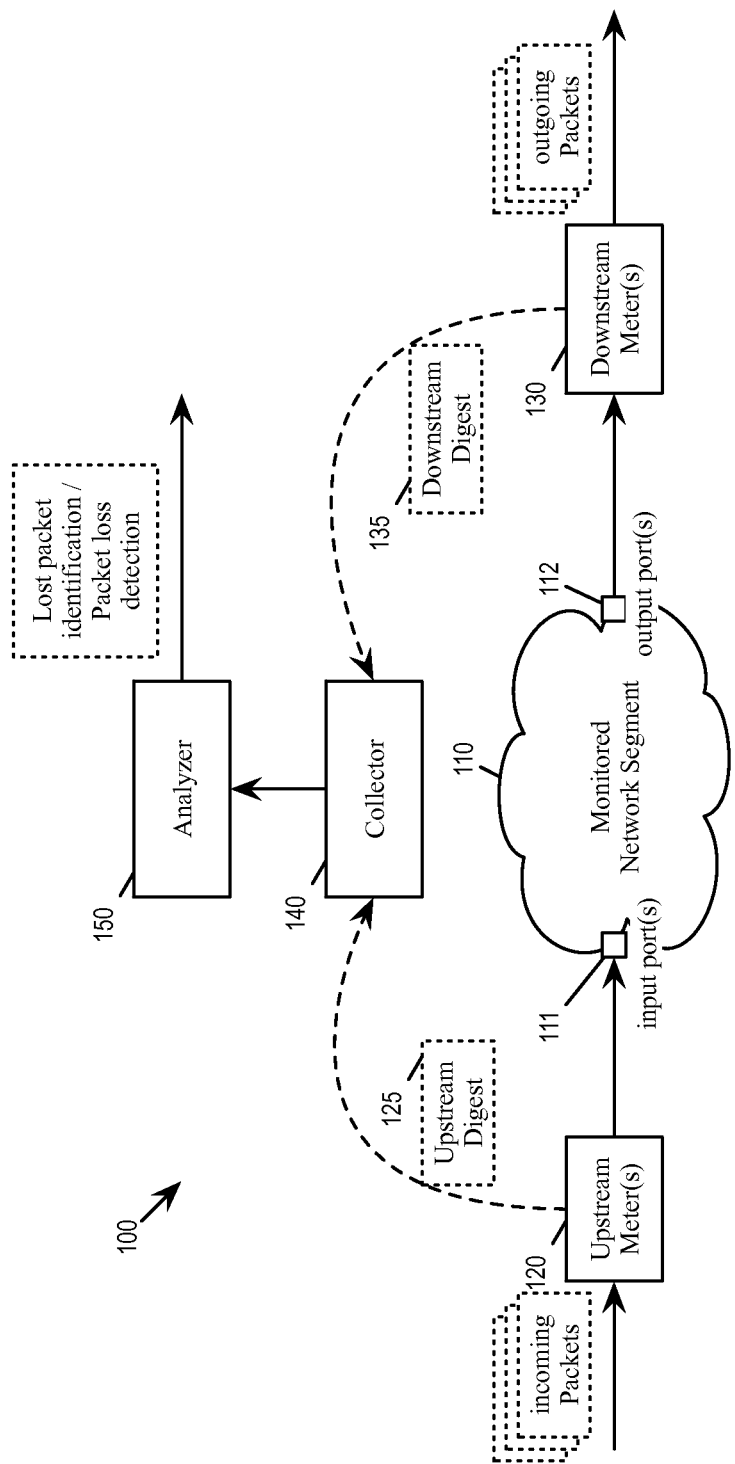
FIG. 1 illustrates a packet loss detection system that is capable of reporting the identities of the lost packets.

FIG. 1 illustrates a packet loss detection system that is capable of reporting the identities of the lost packets. The system detects packet loss through a segment 110 of a network 100. The system collects traffic digests from meters that are installed at input and output ports of the segment 110. The collected traffic digests are in turn analyzed to detect packet loss and to determine the identity of the lost packets.

As illustrated, the segment 110 has a set of input ports 111 and a set of output ports 112. All inbound packet traffic to the network segment 110 goes through the set of input ports 111 and all outbound packet traffic from the network segment goes through the set of output ports 112. The inbound packet traffic is metered by a set of upstream meters 120, which generates a set of upstream digests 125. The outbound traffic is metered by a set of downstream meters 130, which generates a set of downstream digests 135. A collector 140 collects the generated digests 125 and 135, and an analyzer 150 performs analysis of the collected digest to determine whether there is packet loss and to identify the lost packets. Though illustrated as separate modules, in some embodiments, the collector 140 and the analyzer 150 are different processes performed by a same device. In some embodiments, the collector 140 both collects the traffic digests and analyzes the collected digests for packet loss detection and identification.

Figure 2:
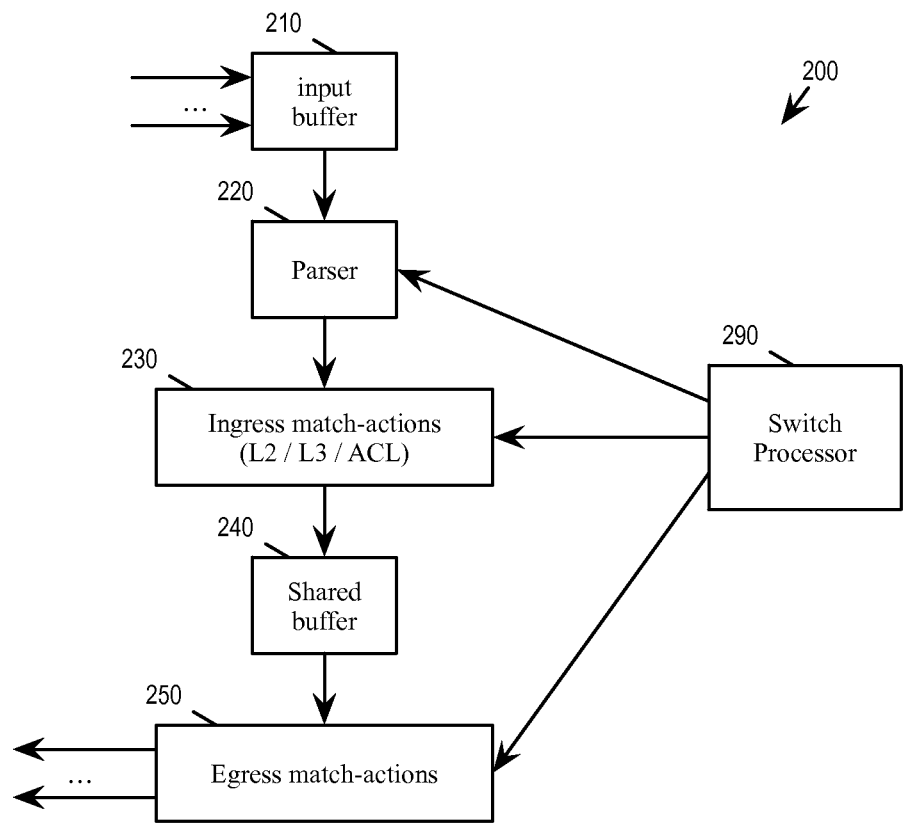
FIG. 2 illustrates an example packet-processing pipeline that can be monitored by the packet loss detection system.

In some embodiments, the network 100 is part of a data center, and the network segment 110 being monitored by the aforementioned packet loss detection and identification system can be a link, a switch, a group of switches, or other types of packet processing pipeline in the data center. FIG. 2 illustrates an example packet-processing pipeline 200 that can be monitored by the packet loss detection system.

As illustrated, the packet-processing pipeline 200 is a match-action packet processing pipeline that includes an input buffer 210, a parser 220, an ingress match-action pipeline 230, a shared buffer 240, and an egress match-action pipeline 250. These various modules are controlled by a switch processor 290. The packet-processing pipeline can be performing L2 level switching, L3 level routing, and/or L4 level flow or session processing or access control. Packet losses can happen at any place in the packet-processing pipeline 200. Further descriptions of match-action packet processing (such as OpenFlow) and the various types of tables/logical memories can be found in U.S. Patent Application Publication No. 2014/0241361 and U.S. Patent Application Publication No. 2014/0241358. U.S. Patent Application Publication No. 2014/0241361 and U.S. Patent Application Publication No. 2014/0241358 are herein incorporated by reference.

Several more detailed embodiments of the invention are described below. Section I describes the content of the traffic digests and how the traffic digests are generated. Section II describes the analysis of the collected traffic digest for detection and identification of lost packets. Section III describes combining digests from multiple meters to produce a union of digests. Section IV describes using identifiers inserted at upstream meters to achieve timing synchronization or to segregate different packet flows. Section V describes an electronic system with which some embodiments of the invention are implemented.

I. Generating of Packet Traffic Digest

In some embodiments, each traffic digest generated by a traffic meter (upstream or downstream) is an accumulation of packet identifying information in a specialized data structure. Specifically, where, for each packet arriving at the traffic meter, the traffic meter extracts packet identifying information from the data packet and incorporates the extracted information into a Bloom-filter based data structure. The data structure has m cells, and the extracted packet identifying information is incorporated into k of cells that are selected by k different hash functions of the extracted packet identifying information.

In some embodiments, each cell incorporates the packet identifying information of an incoming packet by bit-wise exclusive-or (XOR) it with an accumulated value stored by the cell. The cell also maintains a counter that keeps track of how many packets has been hashed into the cell (i.e., how many packets whose identifying information has been incorporated into this cell because the cell is selected by one of the k hash functions.)

Figure 3:
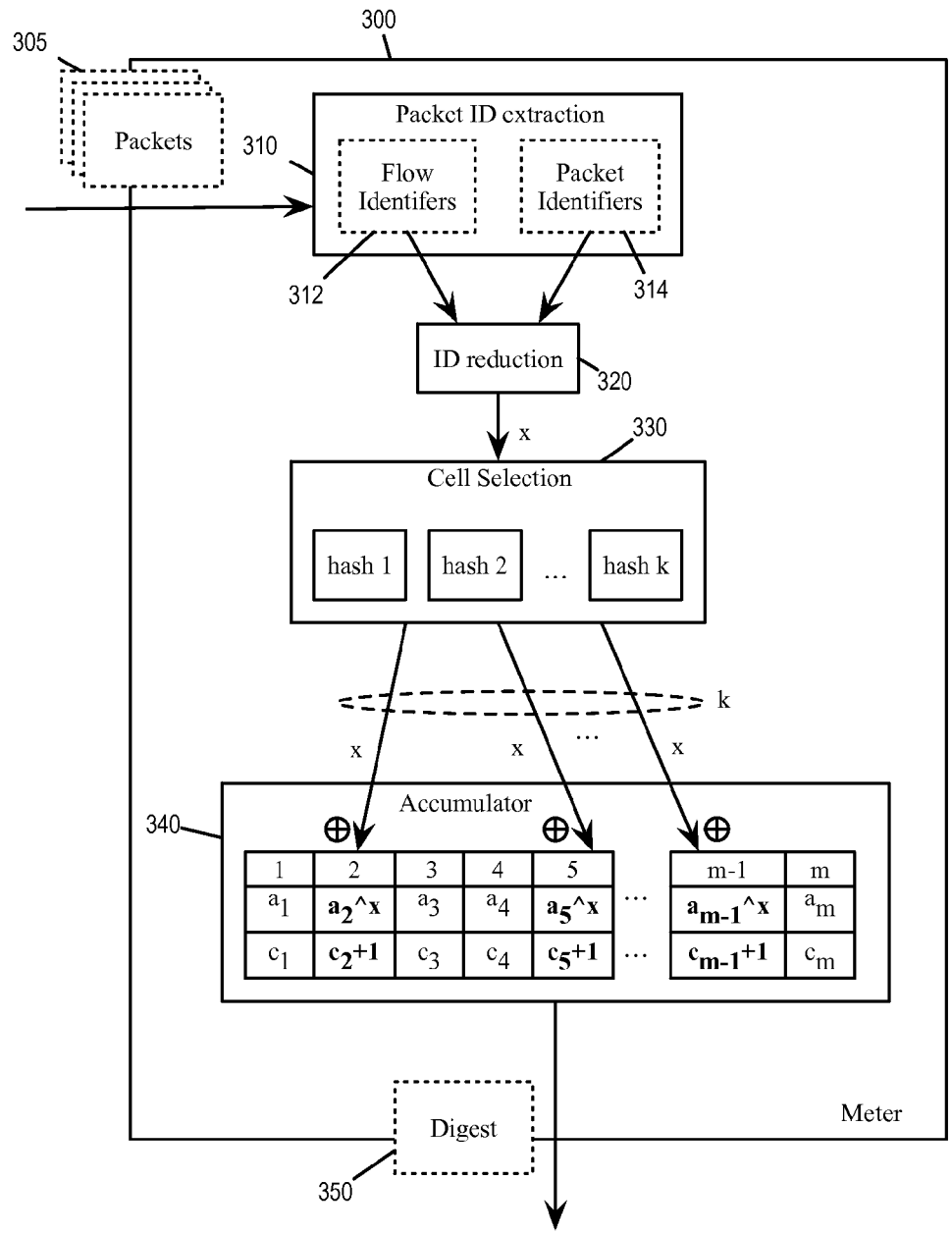
FIG. 3 illustrates a traffic meter that is creating a digest of the packet traffic that it is monitoring.

FIG. 3 illustrates a traffic meter 300 (can be upstream or downstream) that is creating a digest of the packet traffic that it is monitoring. The meter 300 receives or monitors incoming packets 305 and produces a digest 390 of these received/monitored packets. The digest 390 is produced according to a data structure for a Bloom-based filter with m cells and k hash functions. The meter 300 includes a packet ID extraction unit 310, an ID reduction unit 320, a cell selection unit 330, and an accumulator unit 340 in order to implement the Bloom-based data structure.

The packet ID extraction unit 310 extracts from the incoming packets 305 information that can be used to uniquely identify the packet from other packets in the traffic. This is the information that is used to identify this packet if this packet becomes lost. In some embodiments, the extracted packet identifying information includes a set of flow identifiers 312 (e.g., 5-tuple information of source IP address, destination IP address, source port address, destination port address, and transport protocol) and a set of packet identifiers 314. In some embodiments, the packet identifiers 314 are identifiers that are sufficient for distinguishing the packet from other packets belonging to the same flow. Some embodiments use the IP_ID field in packet headers as the unique packet identifier. In some embodiments, when the IP_ID field is not sufficient (e.g., if more than 64K packets from a single flow are monitored in a single monitoring window), a hash of the packet header along with a small fraction of the payload is used as a unique ID. Some embodiments configure the meter 300 to store other packet header fields as unique packet identifiers, as long as these fields remain the same at upstream and downstream meters.

The ID reduction unit 320 is present in some embodiments for reducing the number of bits in the packet identifying information into a desired number of bits for incorporation into the digest. In some embodiments, this is a hash function that takes the extracted packet identifying information and produces a hash value "x" for the packet. In some embodiments, the ID reduction unit is not necessary as the number of bits extracted from each incoming packet is already at the desired number of bits (thus the extracted packet identifying information is the "x" of the packet).

The cell selection unit 330 hashes the extracted (and/or reduced) packet identifying information "x" into cells of the digest. Specifically, the cell selection unit 330 includes k different hash functions to produce k different hash values of "x", and the result of each of these hash values of "x" is used to select one of the m cells in the Bloom-based data structure.

The accumulator 340 implements the m cells of the Bloom-based data structure. Each cell stores an accumulated value and a counter value. Whenever an "x" of an incoming packet is hashed into a cell, the accumulator 340 increments the counter value and takes the accumulated value of the cell and performs a bit-wise exclusive-or addition ($\oplus$ or ^ operator) with the "x". The accumulator 340 then stores the resulting sum as the accumulated value of the cell. In the example illustrated in FIG. 3, the packet identifying information "x" is hashed into cells 2, 5 and m−1, and x is accumulated into those cells by bitwise XOR with the previous accumulated values in those cells (i.e., $a_2$, $a_5$, and $a_{m-1}$). In addition, the corresponding counter values of those cells (i.e., $c_2$, $c_5$, and $c_{m-1}$) are also each incremented by 1.

To produce the digest 350 for the packets 305, the meter 300 outputs the content (accumulated values and counter values) stored in the cells of the accumulator 340 after all packets 305 have been processed by the meter 300.

Figure 4:
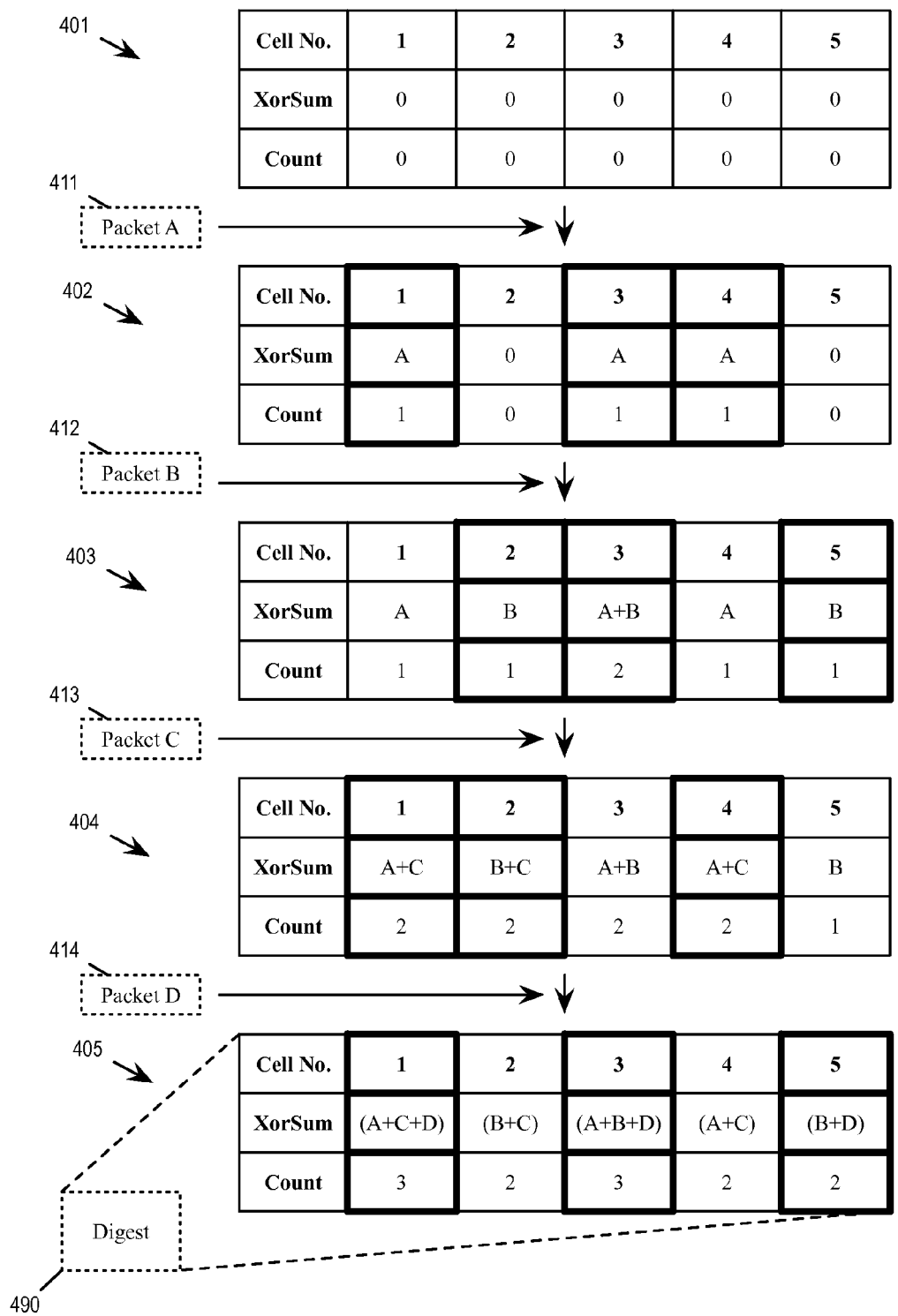
FIG. 4 illustrates an example digest generation operation based on several incoming packets.

FIG. 4 illustrates an example digest generation operation based on several incoming packets. The example is based on a Bloom-based data structure that has five cells (m=5) and three hash functions (k=3). The meter of this example monitored four consecutive incoming packets 411-414 and processed their corresponding packet identification information to produce a digest 490.

The figure illustrates five different stages 401-405 of a corresponding Bloom-based data structure, each stage (except the first state 401) arrived at as a result of an incoming packet. The first stage 401 shows the cells of the Bloom-based data structure at their initial state, i.e., all of which are cleared or set to zero. This is the state before any packet identifying information is accumulated.

The second stage 402 shows the data structure after the packet 411 has been processed. The packet identification information of the packet 411 is represented by "A". As illustrated, the value "A" is hashed into cells 1, 3, and 4. The value "A" is accordingly added into the accumulated sum (xor sum) of those cells by XOR addition. The counter values of cell 1, 3, 4 also increment by 1.

The third stage 403 shows the data structure after the packet 412 has been processed. The packet identification information of the packet 412 is represented by "B". As illustrated, the value "B" is hashed into cells 2, 3, and 5. The value "B" is accordingly added into the accumulated sum (xor sum) of those cells by XOR addition. The counter values of cell 2, 3, 5 are also increment by 1.

The fourth stage 404 shows the data structure after the packet 413 has been processed. The packet identification information of the packet 413 is represented by "C". As illustrated, the value "C" is hashed into cells 1, 2, and 4. The value "C" is accordingly added into the accumulated sum (xor sum) of those cells by XOR addition. The counter values of cell 1, 2, 4 also increment by 1.

The fifth stage 405 shows the data structure after the packet 414 has been processed. The packet identification information of the packet 414 is represented by "D". As illustrated, the value "D" is hashed into cells 1, 3, and 5. The value "D" is accordingly added into the accumulated sum (xor sum) of those cells by XOR addition. The counter values of cell 1, 3, 5 also increment by 1. The fifth stage 405 also produces the digest 490, which reflects the content of the cells at the stage.

In the example of FIG. 4 (as well as FIGS. 6, 7, 9 below), each XORsum is illustrated as a string of symbols for purpose of illustrative clarity. One of ordinary skill would understand that the actual xor-sum value stored by a cell of the Bloom-based data structure is only a binary value; it does not directly indicate what packet identifiers have been hashed into the cell. However, an observer would be able to immediately determine how many packets have been hashed into each cell by looking at the counter value of the cell. For example, the counter value "3" of cell 1 at stage 405 indicates that 3 packets have been hashed into cell 1, the counter value "2" of cell 2 at stage 404 indicates that 2 packets have been hashed into cell 2, etc.

It is worth noting that the amount of memory required to maintain the data structure and to produce the digests is very small. This is because the each additional packet only changes the accumulated values in the cells and nothing else. The identifiers of the packets were never actually stored. The amount of memory required is always determined by the number of cells in the data structure, which does not change with additional packets. In fact, for some embodiments, the number of cells needed (hence the total memory requirement) is determined based on the amount of packet loss anticipated.

Figure 5:
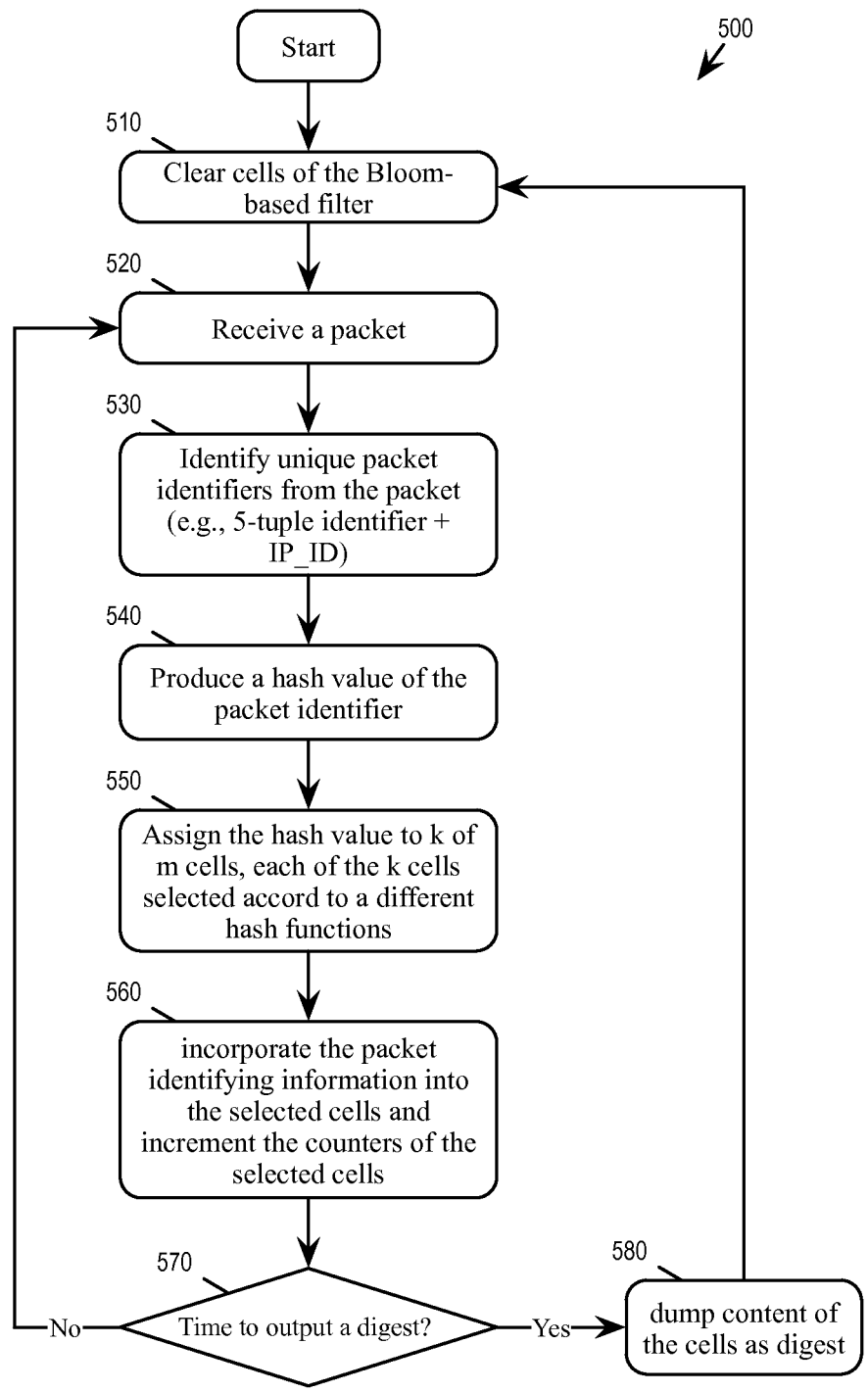
FIG. 5 conceptually illustrates a process for generating a digest in a packet loss detection/identification system.

FIG. 5 conceptually illustrates a process 500 for generating a digest in a packet loss detection/identification system (i.e., LossRadar). In some embodiments, the process 500 is performed by a meter (upstream or downstream) that monitors a port (either input or output) of a network segment. In some embodiments, the process 500 performs the sequence of operations illustrated in FIG. 4.

The process 500 starts by clearing (at 510) cells of the Bloom-based data structure. The clearing operation resets the accumulated value and the counter value of the cell. This corresponds to stage 401 of FIG. 4. This ensures that the digest subsequently produced does not include information from earlier, irrelevant packets.

Next, the process receives (at 520) a packet. If the process 500 is performed by an upstream meter, then the packet is an inbound packet to the network segment. If the process 500 is performed by a downstream meter, then the packet is an outbound packet from the network segment. The process then identifies (at 530) or extracts information from the packet that can be used to uniquely identify the packet, information such as the packet's 5-tuple flow identifiers in conjunction with other information such as IP_ID. This operation corresponds to the packet ID extraction unit 310. The process then produces (at 540) a hash value of the extracted packet identifying information in order to reduce the number of bits, if necessary. This operation corresponds to the ID reduction unit 320.

The process then assigns (at 550) the packet identifying information (reduced by hash) to different cells according to a set of hash functions (e.g., k hash functions for selecting k out of m cells for a Bloom-based data structure). Each of the hash functions hashes the packet identifying information in order to select a cell in the data structure. The process then incorporates (at 560) the packet identifying information into the selected cells and increments the counters of the selected cells. Operations 550 and 560 correspond to the cell selection unit 330 and accumulator unit 340.

The process then determines (at 570) whether it is time to output a digest. In some embodiments, the process references a timer in order to produce a digest periodically. In some embodiments, the process produces a digest whenever the cells of the Bloom-based data structure have accumulated more than certain number of packets. If it is time to output a digest, the process proceeds to 580. Otherwise, the process returns to 520 to receive and process the next packet.

At 580, the process outputs the content of the cells in the data structure as the digest. The process then returns to 510 to clear the data structure for the batch of packets.

II. Detecting and Identifying Lost Packets

As mentioned, some embodiments collect digests produced by upstream meters and downstream meters and analyze the collected information in order to detect packet loss and to determine the identities of the lost packets. In some embodiments, a collector (such as the collector 140 performs such analysis based on the flow conservation rule in graph theory and the current conservation rule in electrical-circuit theory. Namely, for all unidirectional flows or current passing through a segment of the network, the flow entering the segment (also referred to as upstream) must equal to the flow leaving the segment (also referred to as downstream). Any mismatch between the upstream flow and downstream flow indicate packet loss.

In some embodiments, an upstream digest that represents all of the upstream flows into the network segment and a downstream digest that represent all of the downstream flows out of the network segment are compared against each other in order to determine if there is packet loss. Some embodiments further decode the difference between the upstream digest and the downstream digest in order to determine the identity of the lost packets.

Figure 6:
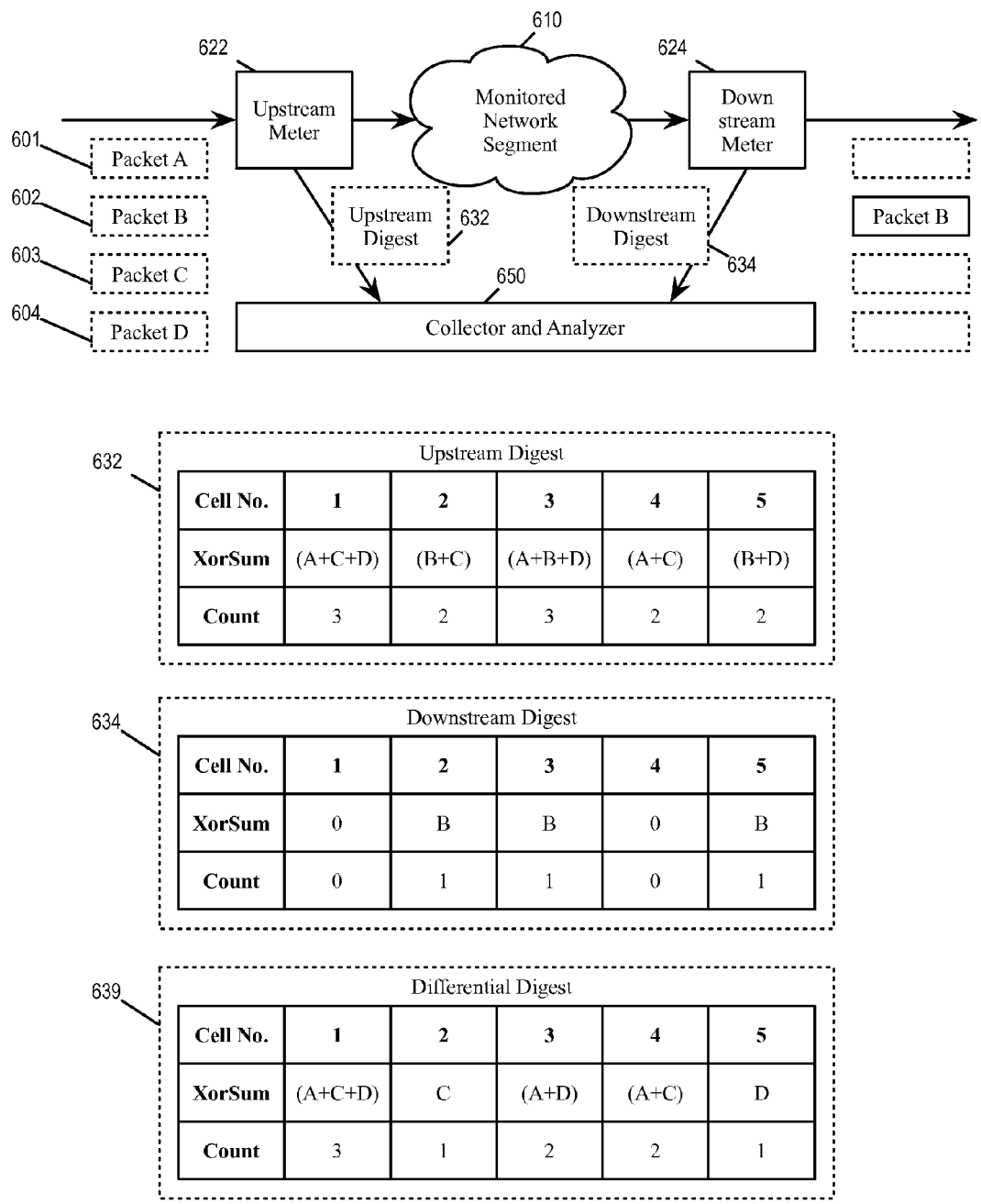
FIG. 6 illustrates packet loss detection and lost packet identification that are based on comparison and analysis of upstream and downstream digests.

FIG. 6 illustrates packet loss detection and lost packet identification that are based on comparison and analysis of upstream and downstream digests. As illustrated, a network segment 610 has an input port 612 that is monitored by an upstream meter 622 and an output port 614 that is monitored by a downstream meter 624. The upstream meter 622 produces an upstream digest 632 and the downstream meter 624 produces a downstream digest 634. Since the input port 612 is the only input port for packet traffic into the network segment 610 and the output port 614 is the only output port for packet traffic out of the network segment 610, the upstream digest 632 represents all of the upstream flow while the downstream digest 634 represent all of the downstream flow. A collector 650 collects both digest 632 and 634, and analyzes their difference for packet loss detection and lost packet identification.

FIG. 6 illustrates an example in which four packets 601-604 (packets "A", "B", "C", and "D") enters the network segment 610 through the input port 612 and expected to exit through the output port 614. The digests of the LossRadar system use a Bloom-based data structure based on 5 cells with 3 hash functions (i.e., every packet is hashed into 3 out of 5 different cells in the data structure).

The upstream digest 632 shows an accumulation of packet identifiers by the upstream meter 622 in a Bloom-based data structure, where the identifier of packet "A" is hashed into cells 1, 3, 4, the identifier of packet "B" is hashed into cells 2, 3, and 5, the identifiers of packet "C" is hashed into cells 1, 2, 4, and the identifier of packet "D" is hashed into cells 1, 3, and 5. The counter values of the cells 1 through 5 respectively shows "3", "2", "3", "2", "2", indicating the number of packets that have been hashed into those cells.

The downstream digest 634 on the other hand shows an accumulation of packet identifiers by the downstream meter 624, where the identifier of B is hashed into cells 2, 3, 5. The counter value of each of these cells shows the value "1", indicating that only one packet has been hashed. (In other words, only packet 602 with packet identifier "B" has reached the downstream meter 624; packets 601, 603, and 604 were lost.)

Since the upstream digest 632 represents all of the upstream flow while the downstream digest 634 represents all of the downstream flow, they should be identical with each other if all of the packets that went through the upstream meter 622 also went through the downstream meter 624 (i.e., no packet loss). In other words, if there is any packet loss, the upstream digest 632 and the downstream digest 634 would be different. In this example, the downstream digest 634 is different than the upstream digest 632, so the collector/analyzer of the LossRadar would know there is packet loss. Furthermore, since the upstream digest is the accumulation of packet identifiers that reached the upstream meter and the downstream digest is the accumulation of packet identifiers that reached the downstream meter, the difference between the upstream digest and the downstream digest is in some embodiments an accumulation of the packet identifiers that were lost.

FIG. 6 illustrates a Bloom-based data structure 639 (or differential digest) that is the difference between the upstream digest 632 and the downstream digest 634. In some embodiments, this differential digest 639 is computed by the collector/analyzer 650. Each cell of the differential digest includes a differential accumulated value and a differential counter value. In some embodiments, the differential accumulated value represents the accumulations of the lost packet identifiers that should have been hashed to the cell, and the differential counter value represents the number of lost packets that should have been hashed to the cell. For example, the differential counter value of cell 1 indicates that three packets were lost.

As mentioned earlier, the accumulated value of a cell shows only the xor-sum of the packet identifiers that have been hashed into the cell. Unless the cell has only one packet hashed in, the cell's accumulated value would not show which packets were actually hashed into the cell. However, the identities of the lost packets can still be determined from the Bloom-based data structure of the differential digest as a whole.

Figure 7:
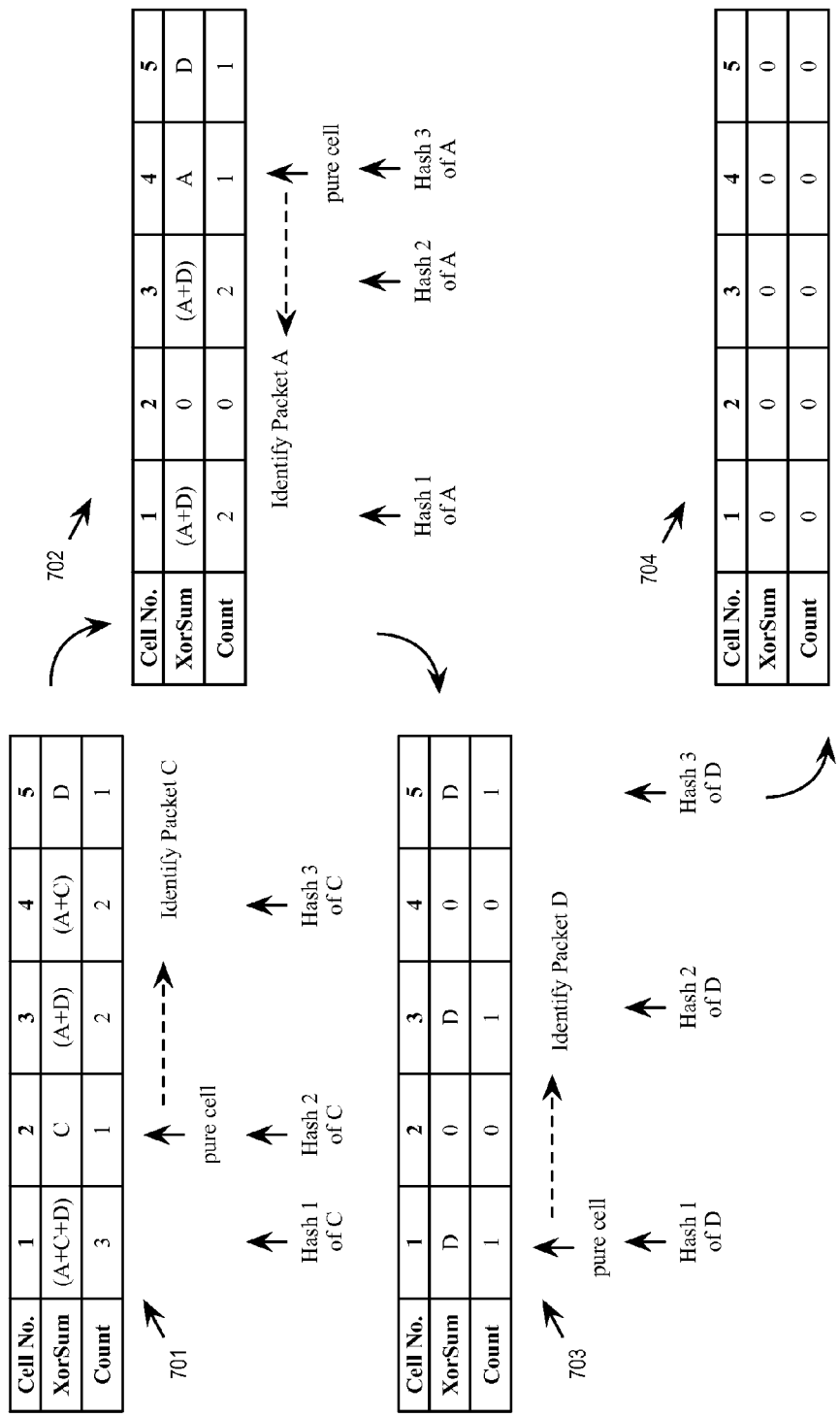
FIG. 7 illustrates an example decoding operation for identifying lost packets.

FIG. 7 illustrates an example decoding operation for identifying lost packets. Specifically, the figure illustrates using the differential accumulated values and differential counter values of the different digest 639 to determine the identities of the lost packets. The decoding process is illustrated in four stages 701-704 of a corresponding Bloom-based data structure.

The first stage 701 shows the identification of a "pure cell" in the data structure. A "pure cell" is a cell that has only one packet identifier hashed into it. Such a cell is easily identifiable because its counter value is "1". Since only one packet was ever hashed into the pure cell, its accumulated value is necessarily the packet identifier of that one packet. At the first stage 701, both cell 2 and cell 5 are pure cells whose (differential) counter values are '1'. In other words, the (differential) accumulated values of cell 2 and cell 5 are necessarily the packet identifiers of lost packets.

The decoding operation initially uses the accumulated value of the pure cell 2 to report the identity of a lost packet (which is "C" of packet 603). Since every packet is hashed into 3 different cells according to 3 different hash functions, the decoding operation then apply those 3 different hash functions to the packet identifier "C" in order to identify the 3 cells that the packet identifier is hashed into. As illustrated, the three hash functions hashed the identifier "C" into cells 1, 2, and 4. The decoding process then subtracts (by bitwise XOR) "C" from cells 1, 2, and 4 in order to identify other packet identifiers. The decoding process also subtracts 1 from the counter values of cells 1, 2, and 4. Since this is a differential digest, a cell that is "hash into by a packet" means that the corresponding cell in the upstream digest is hashed into by the identifier of the packet, or that the corresponding cell in the downstream digest should have added the packet identifier into its accumulated value had there been no packet loss.

The second stage 702 shows the data structure after the packet identifier "C" has been subtracted from cells 1, 2, and 4. As illustrated, the removal of packet identifier C has caused cell 4 to become a pure cell with counter value '1'. The process then report the accumulated value of cell 4 as the identity of another lost packet (packet identifier "A" of the packet 601.). The packet identifier "A" is hashed into cells 1, 3, and 4, so the process subtracts packet identifier A from cells 1, 3, and 4.

The third stage 703 shows the data structure after the packet identifier "A" has been subtracted from cells 1, 3, and 4. As illustrated, though the removal of "A" has not caused any cells to become a pure cell, the cell 5 remains a pure cell that has not been used to decode the different digest. Consequently, the process reports the accumulated value of cell 5 as the identity of another lost packet (packet identifier "D" of the packet 604.). The packet identifier "D" is hashed into cells 1, 3, and 5, so the process subtracts packet identifier "D" from cells 1, 3, and 5.

The final stage 704 show the data structure after the packet identifier "D" has been subtracted from cells 1, 3, and 5. As illustrated, the accumulated values and the counter values of all cells of the structure are zero. This indicates that there are no more lost packet to be identified, and the decoding process is complete.

Figure 8:
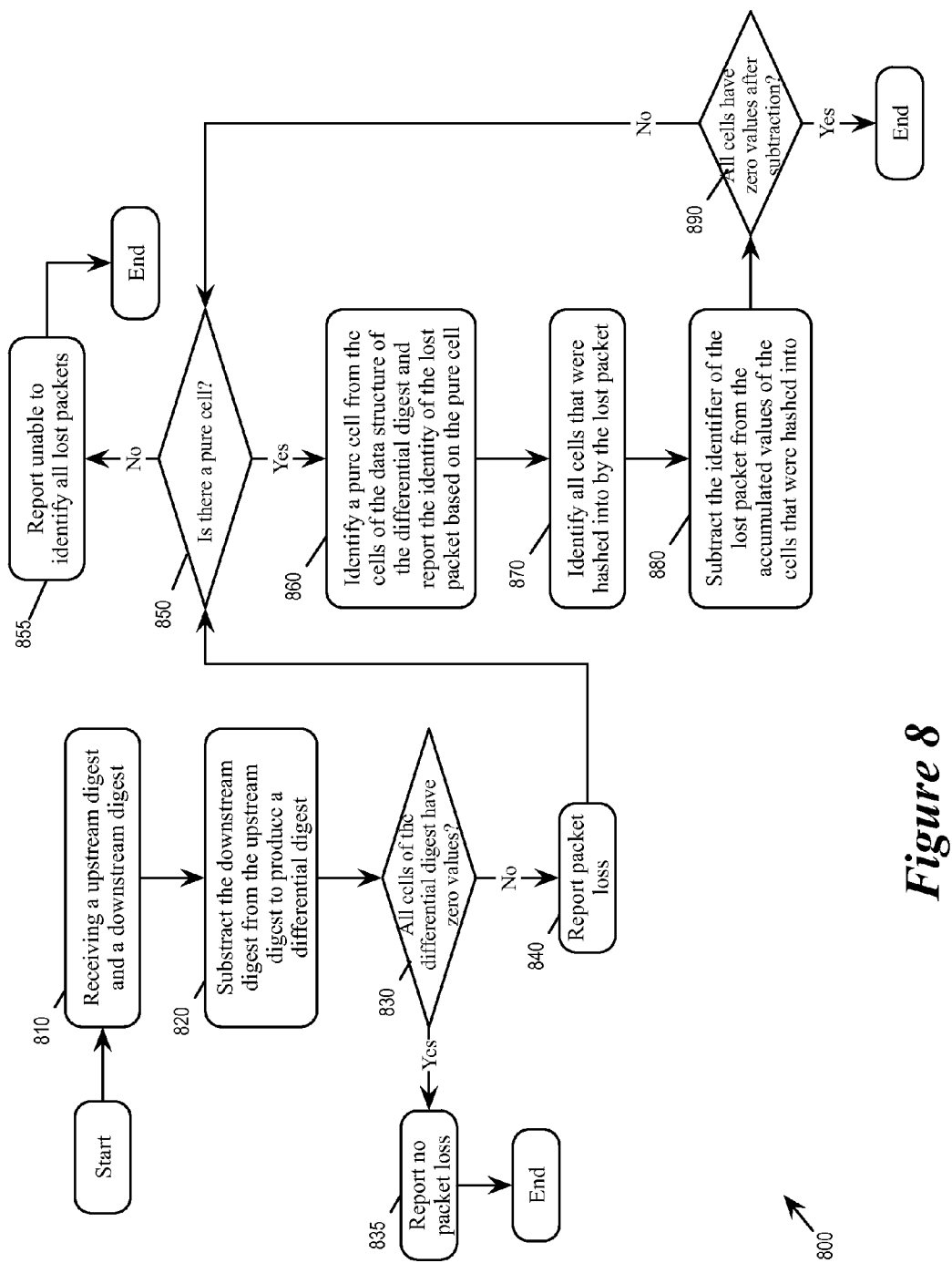
FIG. 8 conceptually illustrates a process for identifying lost packets and report packet loss.

For some embodiments, FIG. 8 conceptually illustrates a process 800 for identifying lost packets and report packet loss. The process 800 is performed by a collector/analyzer of meter digests (such as 650) in some embodiments. The process starts when it receives (at 810) an upstream digest and a downstream digest of network packet traffic through a network segment. The process then subtracts (820) the downstream digest from the upstream digest to produce a different digest (such as the differential digest 639).

The process then determines (at 830) whether all cells of the differential digest have zero values. If all cells of the differential digest have zero values, the process reports (at 835) that there is no packet loss and ends. If the cells of the differential digest are not all zero (i.e., the upstream digest and the downstream digest are not the same), the process proceeds to 840 to report that packet loss has been detected. After reporting that there is packet loss, the process proceeds to 850.

At 850, the process determines whether there is a pure cell among the cells of the data structure of the differential digest. If there is at least one pure cell, the process proceeds to 860. If there is no pure cell even though the cells of the differential digest are not all zero, the process proceeds to 855 to report that it is unable to identify all lost packets and ends.

The process identifies (at 860) a pure cell from the differential digest and reports the identity of a lost packet according to the accumulated value of the pure cell. The identification of a lost packet from pure cells is described by reference to FIG. 7 above. The process then identifies (at 870) all cells that were hashed into by the packet identifier of the lost packet, i.e., to identify the k cells that were selected by the k hash functions of the Bloom-based data structure based on the packet identifier. The process then subtracts (at 880) the values of the identifier of the lost packet (i.e., the accumulated value of the pure cell) from the accumulated values of the cells that were hashed into by the lost packet. The process also decrements the counter value of those cells.

After the subtraction, the process determines (at 890) if all cells of the data structure have zero values. If so, the process 800 ends as there are no more lost packets to be identified. If the accumulated values and/or the counter values of the cells still have non-zero values, the process return to 850 to identify another lost packet with the data structure of the differential digest updated based on the subtracted accumulated values and the decremented values.

It can be seen that when there are more lost packets, more packets would be hashed into the cells of the differential digest, and less likely the process would be able to find a pure cell for identifying the lost packets. However, this can be remedied by allocating more cells (thus to increase the likelihood that there will be at least one pure cell). In other words, the number of cells needed is based on the expected number of lost packets. However, even when there is more packet loss than anticipated (i.e., not enough cells), the process would be able to detect packet loss and identify perhaps some of the lost packets.

III. Union of Packet Traffic Digests

When there is only one input port and only output port to the network segment, the digest generated by a upstream meter at the lone input port would represent all of the upstream flow, while the digest generated by a downstream meter at the output port would represent the all of the downstream flow. However, when there are multiple input ports and/or multiple output ports, the digest generated by one individual upstream meter would not be able to represent all upstream flow and the digest generated by one individual downstream meter would not be able to represent all downstream flow. However, some embodiments allows union of the upstream digests as well as union of downstream digests. The union of upstream digests (or upstream digest union) would represent all of the upstream flows into the network segment and the union of downstream digests (or downstream digest union) would represent all of the downstream flows out of the network segment. The upstream digest union and the downstream digest union can then be compared with each other to detect packet loss or identify lost packets according methods described in Section II above.

Figure 9:
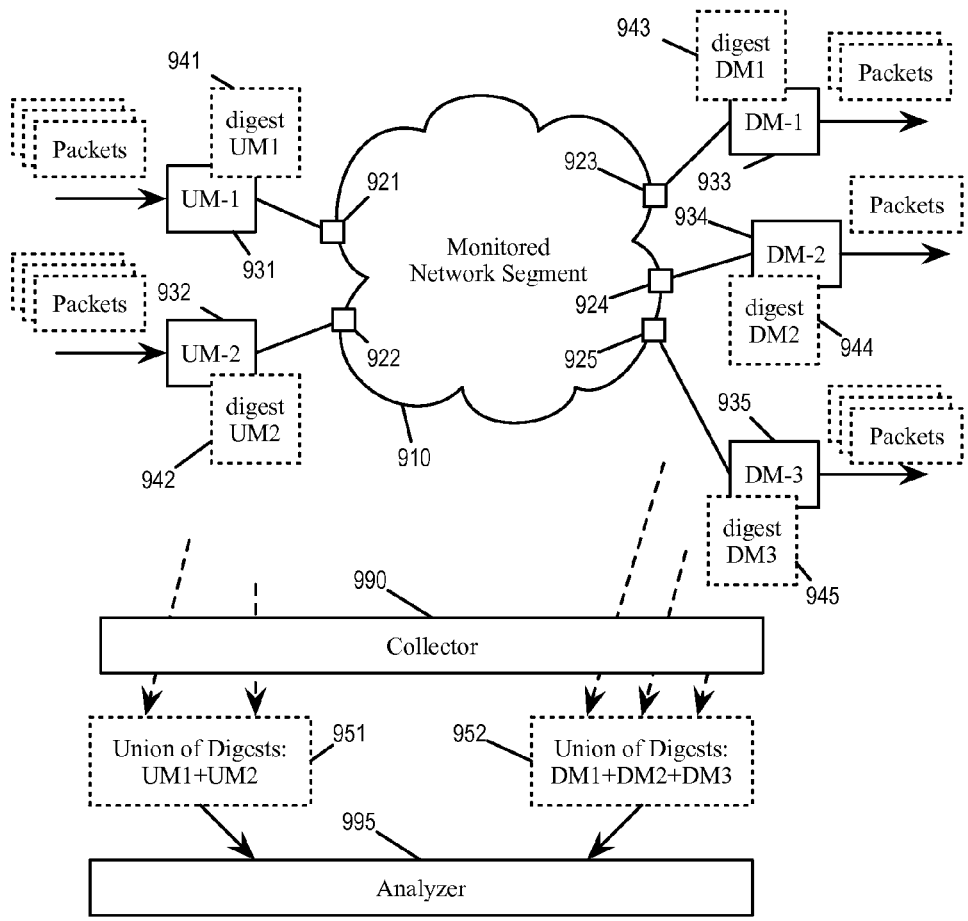
FIG. 9 illustrates using union of digests for detecting packet loss and identifying lost packets in a network segment.
Figure 9:
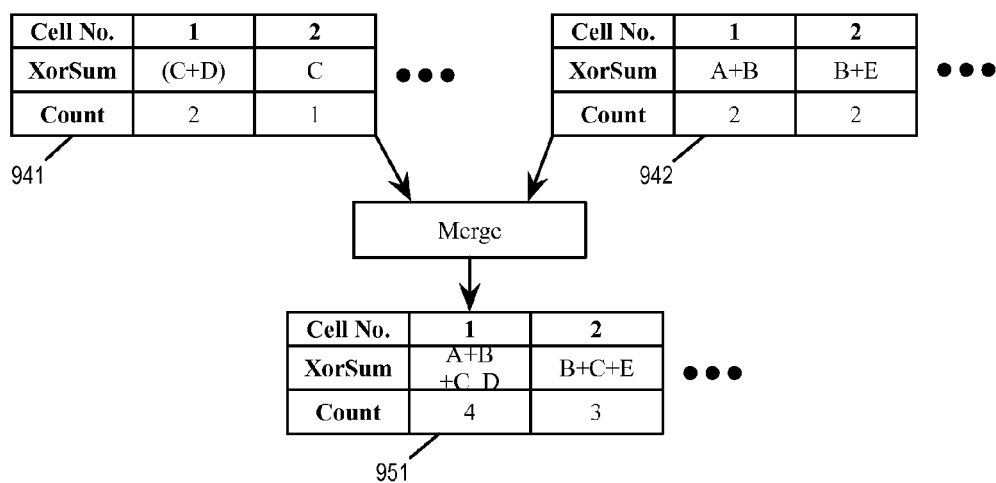

FIG. 9 illustrates using union of digests for detecting packet loss and identifying lost packets in a network segment 910. As illustrated, the monitored network segment 910 has two input ports 921-922 and three output ports 923-925. The two input ports 921-922 are attached upstream meters 931-932, respectively. The three output ports 923-925 are attached downstream meters 933-935, respectively. The upstream meters generates upstream digest 941-942, and the downstream meters generates downstream digests 943-945. Since the upstream traffic is divided between the two input ports, neither of the upstream digests alone represents the complete upstream traffic flow. Likewise, the downstream traffic is divided among the three output ports, none of the downstream digests alone represents the complete downstream flow.

However, a collector 990 collects all of the upstream digests 941-942 and merges them into an upstream digest union 951 and all of the downstream digests 943-945 into a downstream digest union 952. The union 951 of upstream digests 951 is able to represent all upstream flow and the union 952 of downstream digests is able to represent all downstream flow. Analyzer 955 in turn analyzes the two unions of digests to detect packet loss and identify lost packets.

In some embodiments, merging multiple digests into an union entails summing the values from each of the multiple digests for each cell. The counter value of each cell in the union is the arithmetic sum of the corresponding cells in the multiple different digests. The accumulated value (of packet identifiers) of each cell in the union is the bit-wise XOR sum of the corresponding cells in the different digests. For example, cell 1 of the upstream digest 941 has accumulated value (XOR-sum) C+D and cell 1 of the upstream digest 942 has accumulated value A+B. Cell 1 of the union 951 therefore has accumulated value A+B+C+D and counter value 4. Likewise, cell 2 of the upstream digest 941 has accumulated value (XOR-sum) C and cell 2 of the upstream digest 942 has XOR-sum of B+E. Cell 2 of the union 951 therefore has accumulated value B+C+E and counter value 3.

IV. Inserted Identifiers a. Segregate Packet Flows by Using Meter ID

In some embodiments, packets observed at an upstream meter can reach multiple downstream meters, where one cannot know which output port would a packet take to exit the monitored network segment. This is possible if the monitored network segment is a black-box switch whose forwarding decision is unknown to the LossRadar. In addition, each output port may receive packets from multiple different input ports, including input ports that are unknown to the LossRadar. In situations like these, a downstream digest may accumulate packet IDs from multiple different input ports, including input ports that are not metered and have no corresponding upstream digest. Such a downstream digest is useless for packet loss detection/identification unless the accumulation of packet IDs is segregated according to input ports.

In order to detect/identify packet loss for packets of a particular input port (and/or to exclude packets of unknown input ports), some embodiments provide identifiers for segregating the accumulation of packet IDs according to input ports. In some embodiments, each upstream meter tags packets entering its corresponding input port with an ID identifying the input port or the upstream meter. Downstream meters receiving these packets can therefore segregate the accumulation of packet identifiers according to the upstream meter IDs.

Figure 10:
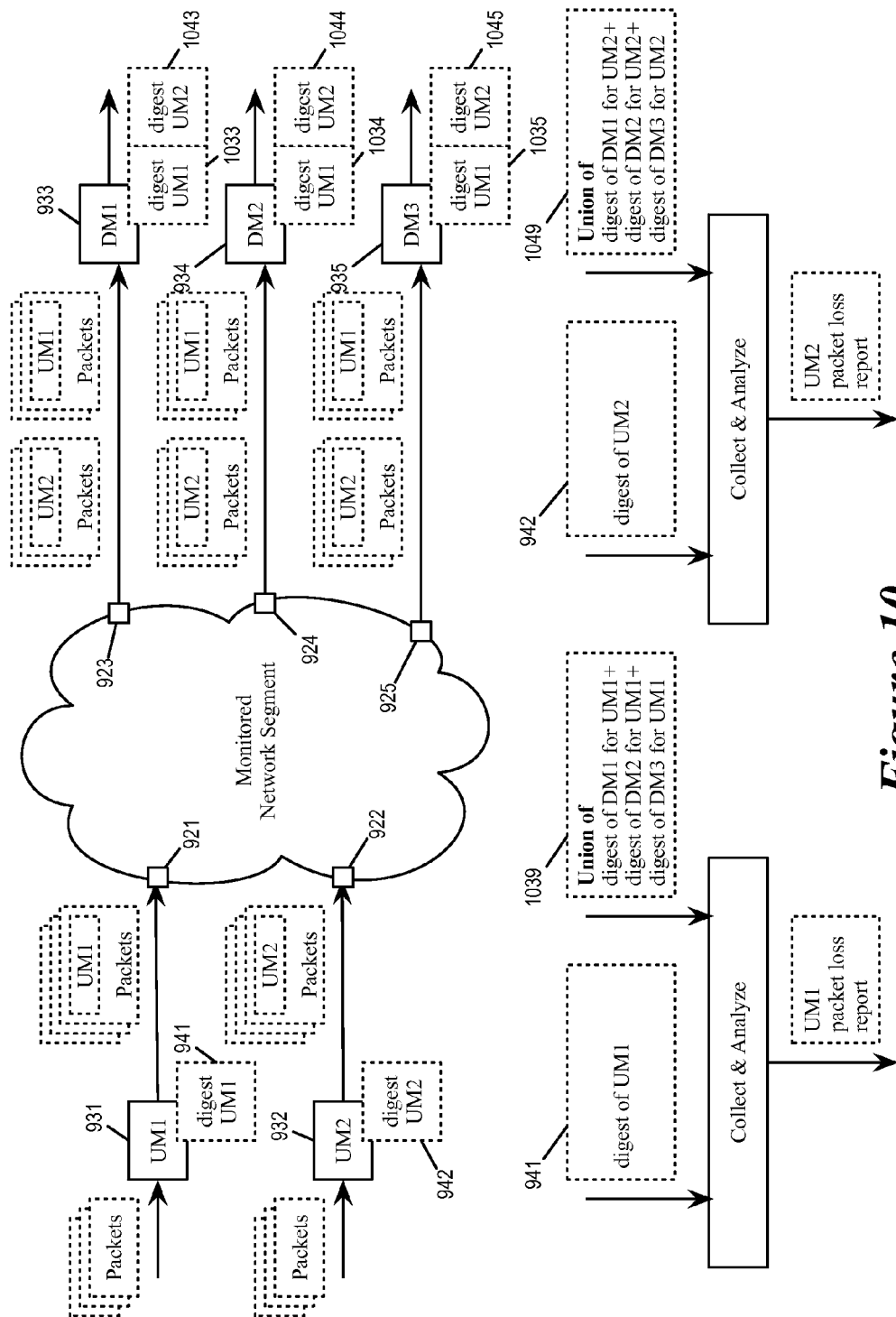
FIG. 10 illustrates using upstream meter IDs to segregate the accumulation of packet IDs in order to perform packet loss detection and identification.

FIG. 10 illustrates using upstream meter IDs to segregate the accumulation of packet IDs in order to perform packet loss detection and identification. Specifically, the figure illustrates the use of meter IDs for detecting packet losses by the network segment 910, which has input ports 921-922 that are metered by upstream meters 931-932 and output ports 923-925 that are metered by downstream meters 933-935. The upstream meter 931 (UM1) produces the upstream digest 941 and the upstream meter 932 (UM2) produces the upstream digest 942.

As illustrated, packets arrived at the upstream meter 931 (and input port 921) are tagged with meter identifier "UM1", while packets arrived at the upstream meter 932 (and input port 922) are tagged with meter identifier "UM2". The packets are distributed by the network segment to output ports 923-925, where each of the output ports 923-925 receives a mix of packets that are tagged with "UM1" and packets that are tagged with "UM2". Consequently each of the downstream meters 933-935 also receives a mix of packets that are tagged with either "UM1" or "UM2".

Each of the downstream meters in turn produces two downstream digests, one digest for each upstream meter ID. Each downstream digest of a particular upstream meter ID is the accumulation of packet identifiers of packets that are tagged with that particular upstream meter ID. Thus, the downstream meter 933 produces a downstream digest 1033 of packets with tag "UM1" and a downstream digest 1043 of packets with tag "UM2". Likewise, the downstream meter 934 produces digests 1034 and 1044 for packets with tag "UM1" and "UM2" respectively, and downstream meter 935 produces digests 1035 and 1045 for packets with tag "UM1" and "UM2" respectively.

These meter-ID-specific downstream digests are collected into meter-ID specific unions. Specifically, downstream digests 1033-1035 for "UM1" are merged into a union 1039 of downstream digests for UM1, while the downstream digests 1043-1045 for "UM2" are merged into a union 1049 of downstream digests for UM2. (The merging of digests is described in Section III above.) Since the digest union 1039 represents the complete packet flow from the input port 921 (with Meter ID "UM1"), it can be meaningfully compared with the upstream digest 941 for packet loss detection/identification. Likewise, since the digest union 1049 represents the complete packet flow from the input port 922 (with Meter ID "UM2"), it can be meaningfully compared with the upstream digest 942 for packet loss detection/identification.

As mentioned, the meter ID is also useful for preventing traffic from unknown input ports from being accumulated into downstream digest. Though not illustrated, an unknown input would not have a corresponding upstream meter and thus its packets would not be tagged with a meter ID. In some embodiments, the downstream meter would not incorporate these unmetered packets into its meter-ID-specific digests.

b. Timing Synchronization (Batch ID)

In order to report packet losses in near real time, meters in some embodiments collects traffic digests in small batches of packets (e.g., every 10 ms or every 1K packets) and immediately report the digests to the central collector as soon as the batch is over. To compare traffic digests correctly between upstream and downstream meters, some embodiments provide a mechanism for a pair of upstream and downstream meters to agree on the boundary of batches so that they can put the same packet in the same batch.

Rather than relying on time-synchronization protocols or devices to determine such batch boundaries, some embodiments let each packet carry the batch information (i.e., batch IDs) explicitly from upstream meters to downstream meters, thereby ensuring timely and accurate reporting of packet losses even when there is packet loss and/or packet reordering.

Figure 11:
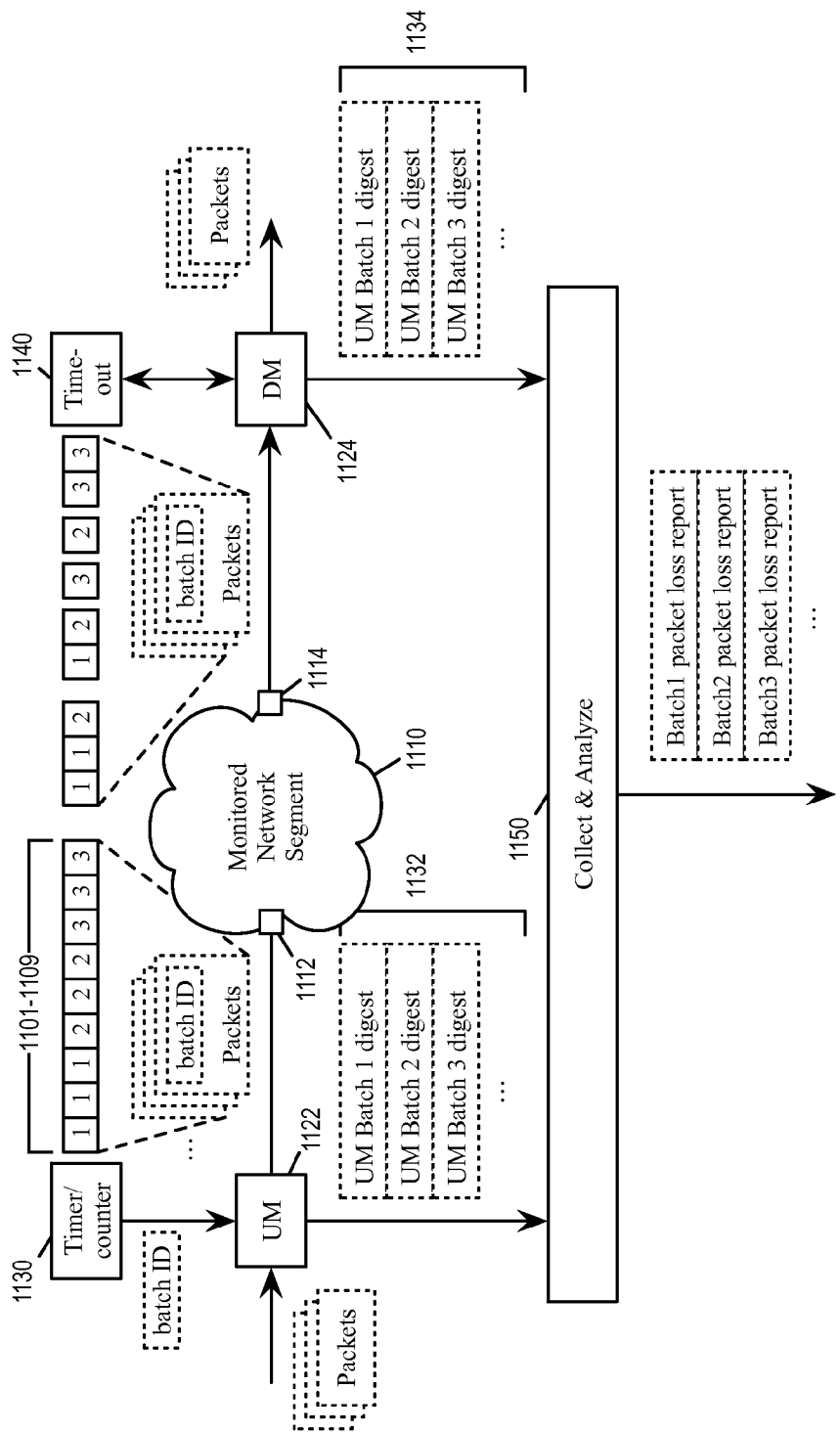
FIG. 11 illustrates using batch IDs for timing synchronization of packet loss detection and identification.

FIG. 11 illustrates using batch IDs for timing synchronization of packet loss detection and identification. In other words, batch IDs are used to ensure that the upstream digest and the downstream digest being compared and analyzed are based on the same set of packets.

As illustrated, a network segment 1110 has an input port 1112 that is monitored by an upstream meter 1122 and an output port 1114 that is monitored by a downstream meter 1124. The upstream meter 1122 produces batch-specific upstream digests 1132 and the downstream meter 1124 produces batch-specific downstream digests 1134. Since the input port 1112 is the only input port for packet traffic into the network segment 1110 and the output port 1114 is the only output port for packet traffic out of the network segment 1110, the upstream digests 1132 represent all of the upstream flow while the downstream digests 1134 represent all of the downstream flow. A collector 1150 collects and analyzes upstream digests 1132 and downstream digests 1134 for packet loss detection and lost packet identification.

The upstream meter 1122 has an associated timer/counter unit 1130 for periodically defining a new batch by generating and assigning a new batch ID. In some embodiments, the timer/counter unit assigns a new batch ID for each fix interval of time. In some embodiments the timer/counter unit assigns a new batch ID for a fix number of packets that pass through the upstream meter 1122. As illustrated, packets 1101-1109 arrive at the meter 1122 and are tagged by the upstream meter with their assigned batch IDs: the first three packet has batch ID "1", followed by another three packet with batch ID "2", and another three packet with batch ID "3".

The packets 1101-1109 make their way through the monitored network segment 1100 and reach the downstream meter 1124. However, each packet arrives at the output port with its own latency, and the packets do not necessarily arrive in their original sequence. However, the downstream meter 1124 is able to use the batch IDs in the received packets to generate a downstream digest for each batch, i.e., to accumulate packet IDs separately for each batch. In some embodiments, the downstream meter has a buffer (not illustrated) for holding the accumulated value of a batch while waiting for all packets of the batch to arrive. In some embodiments, the downstream meter 1124 has a time-out mechanism 1140 so it would only wait for lost packets of a batch for a limited window of time before generating the downstream digest for the batch.

The collector 1150 collects the batch-specific upstream digests 1132 and the batch-specific downstream digests 1134, compares each corresponding pair of batch specific digests, determines whether there is packet loss, and identifies the identities of lost packet according to operations described in Section II above.

Generally speaking, as long as the upstream meter and the downstream meter reliably agree on the definition of the set of packets being measured, any solution (such as batch ID) can be used to achieve timing synchronization of packet loss detection and identification. In systems in which timing synchronization can be reliably used to define the set of packets being measured (e.g., when latency through the monitored segment is predictable), some embodiments do use timing synchronization for packet loss detection and identification.

In some embodiments, when there are multiple input ports (i.e., upstream) around a black box, the upstream meter insert a meter ID to each packet in addition to the batch ID so downstream meters can store separate digests for each upstream meter as described above in Section IV-a.

c. Packet Sink & Packet Source

As mentioned, the LossRadar (the packet loss detection and identification system) is designed in some embodiments according to the Flow Conservation Rule: the set of packets that comes into any network domain (a link, a module in a switch, a switch, or an area of multiple network devices) should be equal to the set of packets that leaves the domain, as long as the domain does not include any packet sources and sinks (e.g., middleboxes, hosts). However, in some embodiments, a network switch can occasionally behave as a packet source or sink for certain types of packets (e.g., routing protocol messages, switch management protocol messages). These packets, however, can be easily and unambiguously distinguished and hence can be exempted from the LossRadar mechanism. In other words, in some embodiments, the packet IDs of these packets will not be part of the accumulation in the meter digests and therefore will not affect the packet loss detection/lost packet identification operations.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
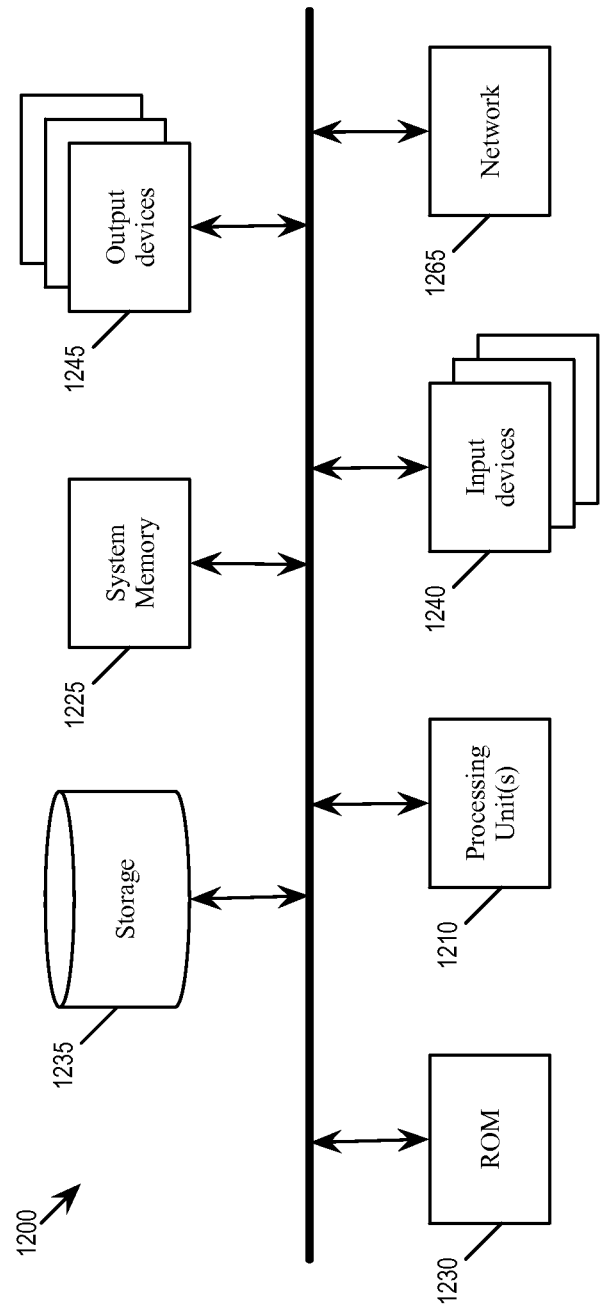
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for monitoring packets flowing through a segment of the network, the method comprising:
   generating a first digest of a first plurality of packets entering the monitored segment of the network and a second digest of a second plurality of packets leaving the monitored segment of the network, wherein generating a digest of a plurality of packets comprises:

extracting packet identifying information from each packet;

hashing the extracted information of each packet by using a plurality of hash functions;

selecting a plurality of cells from among an array of cells based on the hashed information;

accumulating the extracted identifying information of each packet in the selected plurality of cells; and providing values accumulated in the array of cells in the digest;

determining that the first digest and the second digest are different;

identifying as lost a packet that is in the first plurality of packets but not in the second plurality of packets by decoding the difference between the first digest and the second digest; and reporting the identity of the identified lost packet.

2. The method of claim 1, wherein accumulating the extracted identifying information in the selected cells comprises adding the extracted identifying information to an accumulated value in each of the selected cells by using a bit-wise exclusive OR (XOR) function.

3. The method of claim 2, wherein accumulating the extracted identifying information in the selected cells further comprises incrementing a counter value in each of the selected cells.

4. The method of claim 1, wherein each cell maintains an accumulated value for accumulating packet-identifying information and a counter value for counting the number of packets that are accumulated in the cell.

5. The method of claim 1, wherein the number of cells in the array of cells is independent of the number of packets being monitored.

6. A system comprising:
a first meter that generates a first digest of a first plurality of packets entering the monitored segment of the network and a second meter that generates a second digest of a second plurality of packets leaving the monitored segment of the network, wherein a meter generates a digest of a plurality of packets by:

extracting packet identifying information from each packet;

hashing the extracted information of each packet by using a plurality of hash functions;

selecting a plurality of cells from among an array of cells based on the hashed information;

accumulating the extracted identifying information of each packet in the selected plurality of cells; and providing values accumulated in the array of cells in the digest; and an analyzer that (i) determines that the first digest and the second digest are different and (ii) identifies as lost a packet that is in the first plurality of packets but not in the second plurality of packets by decoding the difference between the first digest and the second digest, and (iii) reports the identity of the identified lost packet.

7. The system of claim 6, wherein the meter accumulates the extracted identifying information to the selected cells by adding the extracted identifying information to an accumulated value in each of the selected cells by using a bit-wise exclusive OR (XOR) function.

8. The system of claim 7, wherein the meter accumulates the extracted identifying information in the selected cells by incrementing a counter value in each of the selected cells.

9. The system of claim 6, wherein each cell maintains an accumulated value for accumulating packet-identifying information and a counter value for counting the number of packets that are accumulated in the cell.

10. The system of claim 6, wherein the number of cells in the array of cells is independent of the number of packets being monitored.

11. A computing device for monitoring packets flowing through a segment of the network, the device comprising:
a set of processing units; and
a machine readable medium storing a program for execution by at least one of the processing units, the program comprising sets of instructions for:

receiving a first digest of a first plurality of packets entering the monitored segment of the network and a second digest of a second plurality of packets leaving the monitored segment of the network, wherein a received digest comprises values that are accumulated from packet identifying information extracted from each packet and stored in a plurality of cells, wherein the extracted identifying information of each packet is hashed using a plurality of hash functions and the plurality of cells are selected from among an array of cells based on the hashed information;

determining that the first digest and the second digest are different;

identifying as lost a packet that is in the first plurality of packets but not in the second plurality of packets by decoding the difference between the first digest and the second digest; and reporting the identity of the identified lost packet.

12. The computing device of claim 11, wherein the extracted identifying information is accumulated at the selected cells by adding the extracted information to an accumulated value in each of the selected cells by using a bit-wise exclusive OR (XOR) function.

13. The computing device of claim 11, wherein each cell maintains an accumulated value for accumulating packet-identifying information and a counter value for counting the number of packets that are accumulated in the cell.

14. The computing device of claim 11, wherein the number of cells in the array of cells is independent of the number of packets being monitored.

* * * * *

UNITED STATES PATENT AND TRADEMARK OFFICE
CERTIFICATE OF CORRECTION

| | |
|---|---|
| PATENT NO. | : 10,044,583 B2 |
| APPLICATION NO. | : 14/832221 |
| DATED | : August 7, 2018 |
| INVENTOR(S) | : Changhoon Kim, Minlan Yu and Yuliang Li |

It is certified that error appears in the above-identified patent and that said Letters Patent is hereby corrected as shown below:

In the Specification
Please add before "Background":
STATEMENT AS TO FEDERALLY SPONSORED RESEARCH
This invention was made with government support under contract number 1453662 awarded by the National Science Foundation (NSF). The government has certain rights in this invention.

Signed and Sealed this
Nineteenth Day of April, 2022

Katherine Kelly Vidal
*Director of the United States Patent and Trademark Office*